United States Patent
Fu et al.

(10) Patent No.: US 11,218,254 B2
(45) Date of Patent: Jan. 4, 2022

(54) METHOD AND APPARATUS FOR TRANSMITTING/RECEIVING HARQ-ACK SIGNAL IN WIRELESS COMMUNICATION SYSTEM SUPPORTING CARRIER AGGREGATION

(71) Applicant: Samsung Electronics Co., Ltd., Gyeonggi-do (KR)

(72) Inventors: Jingxing Fu, Beijing (CN); Yingyang Li, Beijing (CN); Shichang Zhang, Beijing (CN)

(73) Assignee: Samsung Electronics Co., Ltd

( * ) Notice: Subject to any disclaimer, the term of this patent is extended or adjusted under 35 U.S.C. 154(b) by 48 days.

(21) Appl. No.: 15/547,695

(22) PCT Filed: Jan. 29, 2016

(86) PCT No.: PCT/KR2016/001046
§ 371 (c)(1),
(2) Date: Jul. 31, 2017

(87) PCT Pub. No.: WO2016/122273
PCT Pub. Date: Aug. 4, 2016

(65) Prior Publication Data
US 2018/0019842 A1   Jan. 18, 2018

(30) Foreign Application Priority Data

Jan. 29, 2015 (CN) .......................... 201510048140.0
Apr. 17, 2015 (CN) .......................... 201510184434.6
(Continued)

(51) Int. Cl.
*H04L 1/18*   (2006.01)
*H04L 5/00*   (2006.01)
(Continued)

(52) U.S. Cl.
CPC .......... *H04L 1/1812* (2013.01); *H04L 1/1607* (2013.01); *H04L 1/1854* (2013.01);
(Continued)

(58) Field of Classification Search
None
See application file for complete search history.

(56) References Cited

U.S. PATENT DOCUMENTS 9,419,778 B2    8/2016 Papasakellariou et al.
2012/0207107 A1 8/2012 Li et al.
(Continued)

FOREIGN PATENT DOCUMENTS

CN    102468950    5/2012
CN    102904698    1/2013
(Continued)

OTHER PUBLICATIONS

PCT/ISA/210 Search Report issued on PCT/KR2016/001046 (pp. 3).
(Continued)

*Primary Examiner* — Jeffrey M Rutkowski
*Assistant Examiner* — Basil Ma
(74) *Attorney, Agent, or Firm* — The Farrell Law Firm, P.C.

(57) ABSTRACT

The present disclosure discloses a method and an apparatus for transmitting hybrid automatic repeat request acknowledgement (HARQ-ACK) information by a user equipment (UE) in a wireless communication system supporting carrier aggregation (CA), the method comprises receiving a downlink signal from a base station, determining the number of bits of HARQ-ACK information for cells configured for the UE on the basis of at least one of an uplink downlink assignment index (UL DAI), the number of downlink subframes, the number of the cells configured for the UE, which (Continued)

The size of the bundling window is 4 are acquired from the downlink signal, and a transmission mode, and transmitting an uplink subframe including the HARQ-ACK information for the cells.

6 Claims, 7 Drawing Sheets

(30) Foreign Application Priority Data

Aug. 13, 2015 (CN) .................... 201510498447.0
Nov. 25, 2015 (KR) .................... 10-2015-0165811

(51) Int. Cl.
*H04L 1/16* (2006.01)
*H04L 5/14* (2006.01)
*H04W 72/04* (2009.01)
*H04W 72/12* (2009.01)
*H04W 88/02* (2009.01)

(52) U.S. Cl.
CPC ............ *H04L 1/1864* (2013.01); *H04L 5/001* (2013.01); *H04L 5/0055* (2013.01); *H04L 5/0082* (2013.01); *H04L 5/0091* (2013.01); *H04L 5/1469* (2013.01); *H04W 72/042* (2013.01); *H04W 72/0446* (2013.01); *H04W 72/1284* (2013.01); *H04W 72/1289* (2013.01); *H04L 1/1861* (2013.01); *H04L 5/0023* (2013.01); *H04L 5/14* (2013.01); *H04W 88/02* (2013.01)

(56) References Cited

U.S. PATENT DOCUMENTS

| 2012/0323709 | A1 | 12/2012 | Thomas |
| 2013/0114474 | A1 | 5/2013 | Fu et al. |
| 2013/0195066 | A1* | 8/2013 | Lee .................... H04W 72/042 370/329 |
| 2013/0301600 | A1 | 11/2013 | Park |
| 2013/0322358 | A1* | 12/2013 | He .................... H04W 72/0406 370/329 |
| 2013/0329688 | A1* | 12/2013 | Yang .................... H04L 1/1861 370/329 |
| 2013/0336160 | A1 | 12/2013 | Yin et al. |
| 2014/0071932 | A1 | 3/2014 | Fu et al. |
| 2014/0105164 | A1* | 4/2014 | Moulsley ............ H04W 72/042 370/329 |
| 2014/0192688 | A1* | 7/2014 | Yang .................... H04L 1/1861 370/280 |
| 2014/0286208 | A1* | 9/2014 | Papasakellariou ...... H04L 5/001 370/280 |
| 2017/0289995 | A1* | 10/2017 | Lin .................... H04W 72/0446 |

FOREIGN PATENT DOCUMENTS

| CN | 103095432 | 5/2013 |
| CN | 103314560 | 9/2013 |
| EP | 2 309 787 | 4/2011 |
| EP | 2 709 299 | 3/2014 |
| KR | 1020120084229 | 7/2012 |
| KR | 1020140125705 | 10/2014 |
| WO | WO 2014003456 | 1/2014 |
| WO | WO 2014157867 | 10/2014 |

OTHER PUBLICATIONS

PCT/ISA/237 Written Opinion issued on PCT/KR2016/001046 (pp. 9).
European Search Report dated Feb. 7, 2018 issued in counterpart application No. 16743751.6-1219, 7 pages.
Chinese Office Action dated Jul. 27, 2020 issued in counterpart application No. 201510498447.0, 47 pages.
European Search Report dated Jul. 30, 2020 issued in counterpart application No. 16743751.6-1205, 5 pages.
European Search Report dated Oct. 28, 2021 issued in counterpart application No. 16743751.6-1205, 5 pages.

* cited by examiner

[Fig. 1]
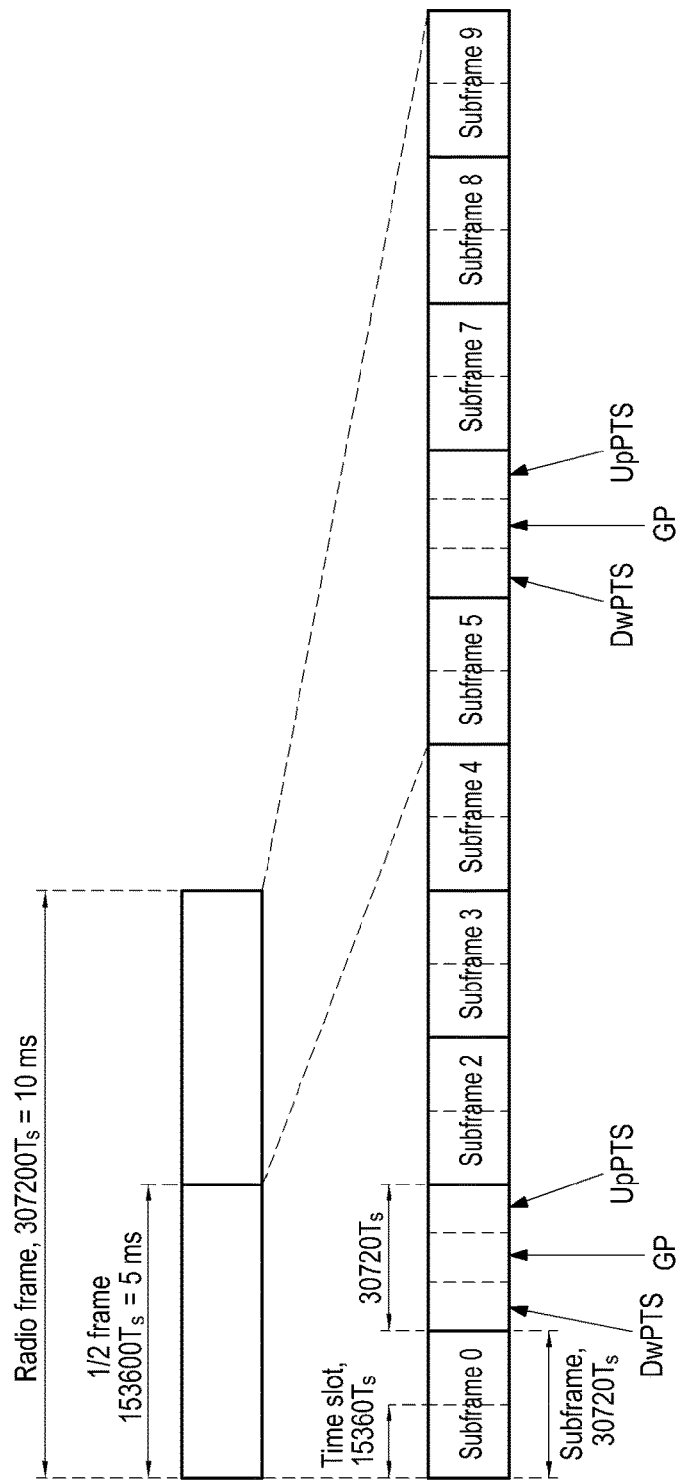
[Fig. 2]
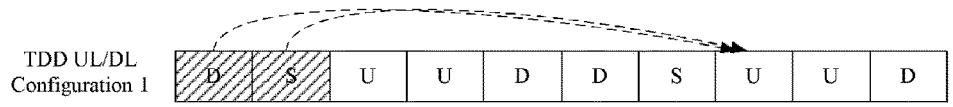

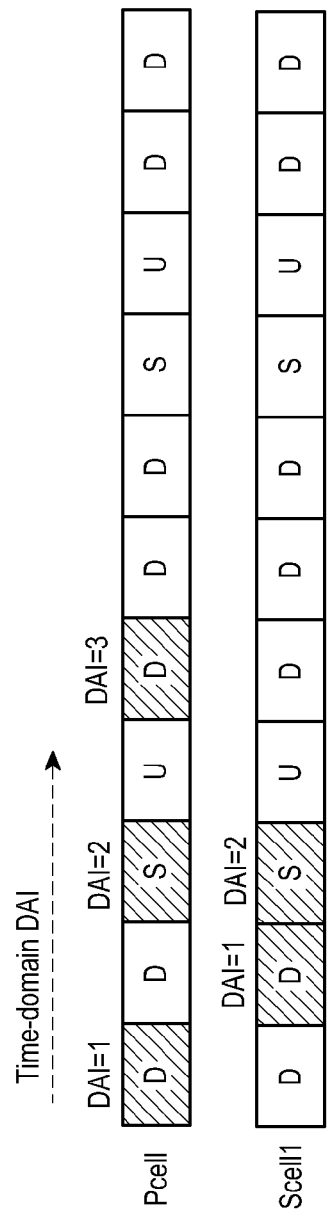
[Fig. 3]

[Fig. 4]
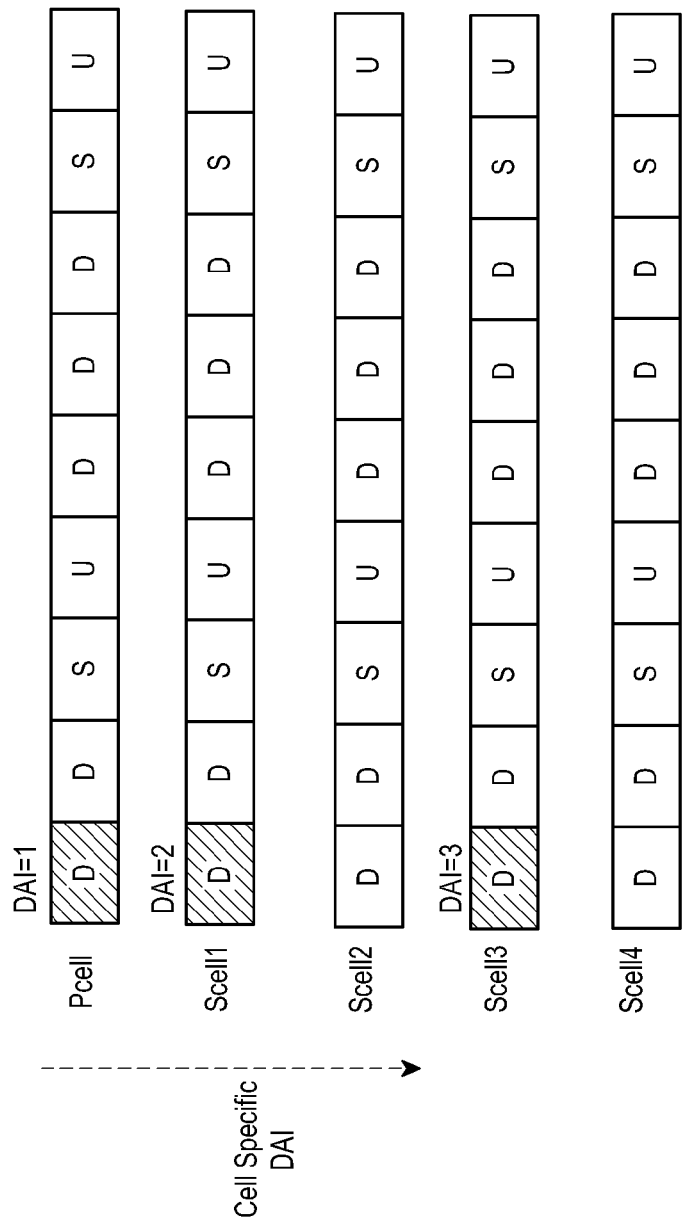

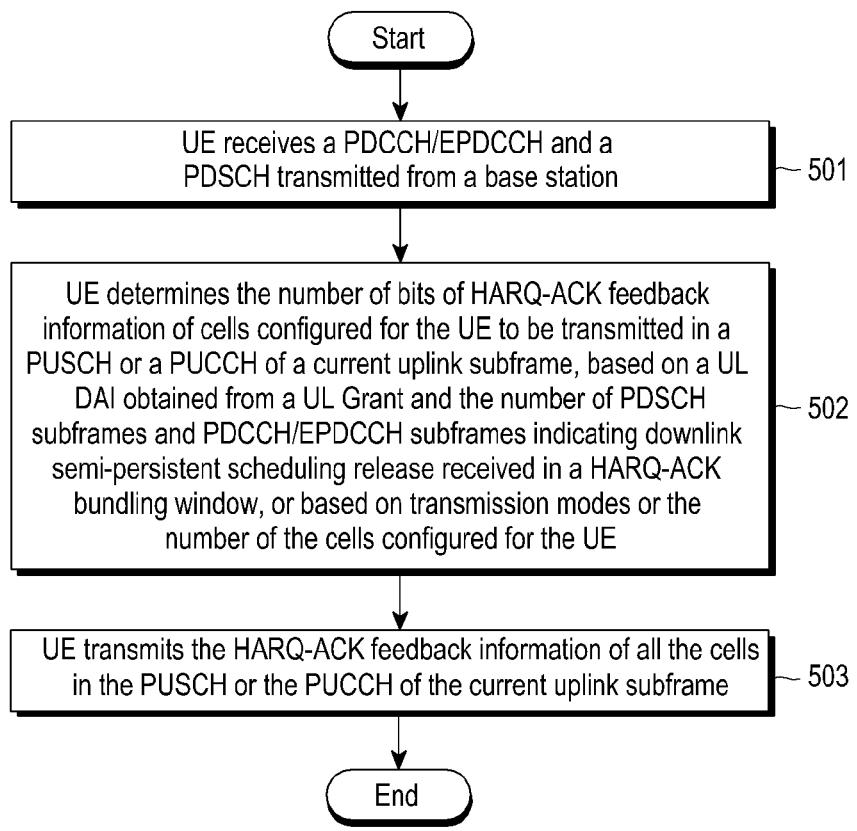

[Fig. 6]
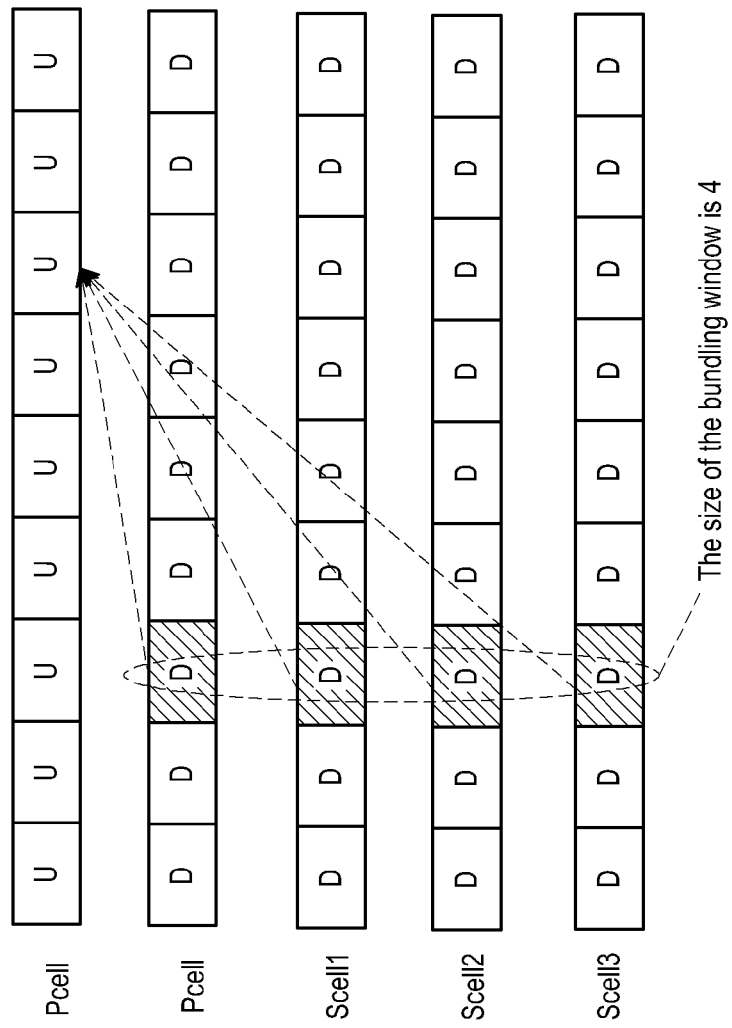

[Fig. 7]
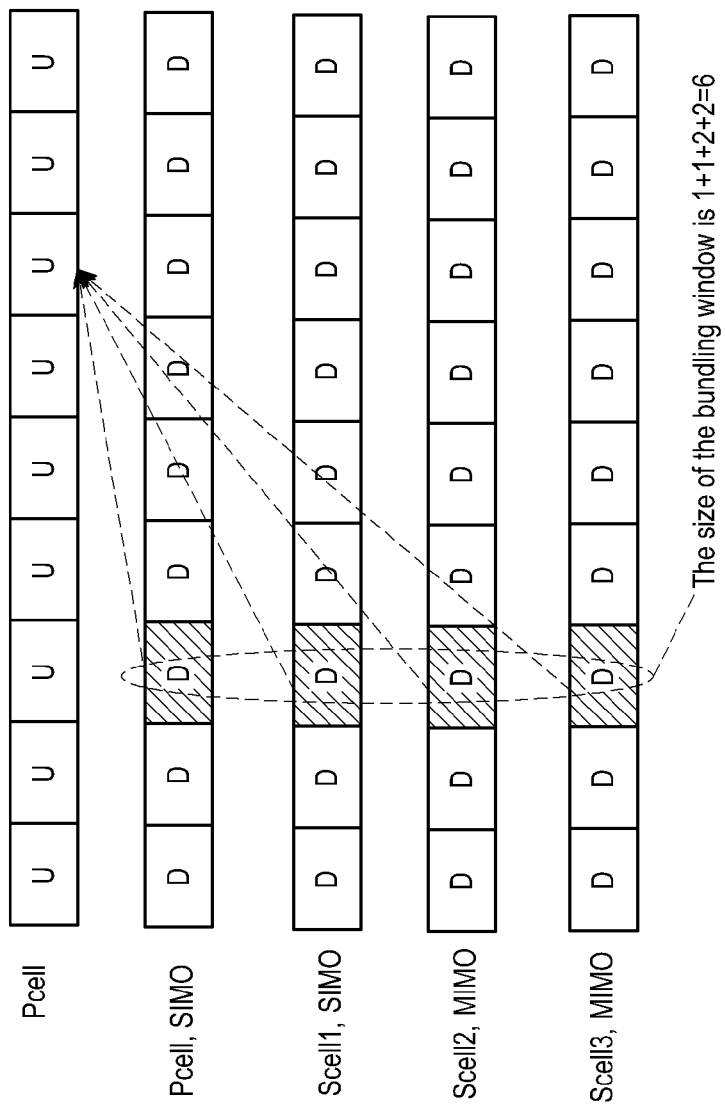

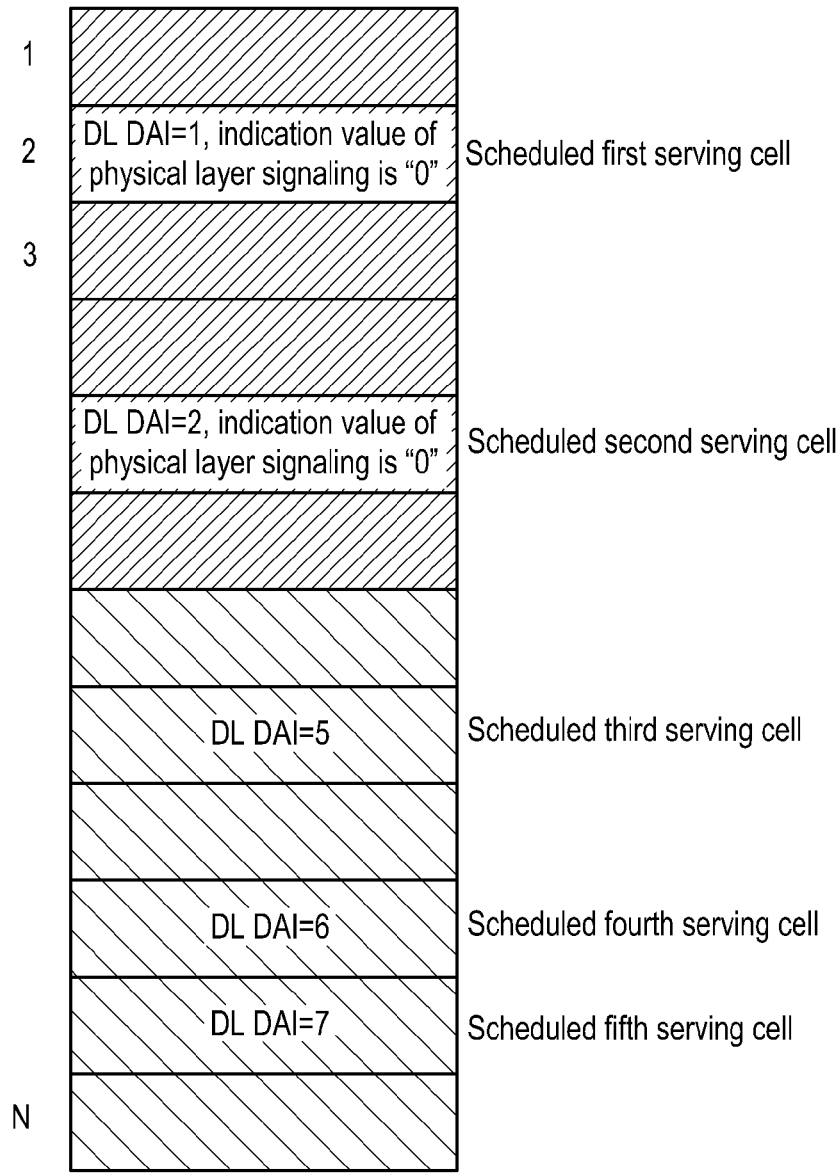
[Fig. 8]

METHOD AND APPARATUS FOR TRANSMITTING/RECEIVING HARQ-ACK SIGNAL IN WIRELESS COMMUNICATION SYSTEM SUPPORTING CARRIER AGGREGATION

This application is a National Phase Entry of International Application No. PCT/KR2016/001046, which was filed on Jan. 29, 2016, and claims priority to Chinese Patent Application Nos. 201510048140.0, 201510184434.6 and 201510498447.0 filed on Jan. 29, 2015, Apr. 17, 2015, and Aug. 13, 2015, respectively, and to Korean Patent Application No. 10-2015-0165811 filed on Nov. 25, 2015, the contents of each of which are incorporated herein by reference.

TECHNICAL FIELD

The present disclosure relates to wireless communication systems, and especially to a method and apparatus for transmitting hybrid automatic repeat request acknowledgement (HARQ-ACK) in an enhanced carrier aggregation system.

BACKGROUND ART

A long term evolution (LTE) system supports two types of duplex: frequency division duplex (FDD) and time division duplex (TDD). FIG. 1 is a frame structure of a TDD system. Each radio frame is 10 ms long, and is equally divided into two half frames having a length of 5 ms each. Each half frame includes 8 timeslots having a length of 0.5 ms each and 3 special fields, i.e., a downlink pilot timeslot (DwPTS), a guard period (GP), and an uplink pilot timeslot (UpPTS). An overall length of the 3 special fields is 1 ms. Each subframe consists of two consecutive timeslots, i.e., subframe k containing timeslot 2k and timeslot 2k+1. The TDD system supports 7 different TDD downlink and uplink configurations, as shown in table 1. In table 1, "D" represents a downlink subframe, "U" represents an uplink subframe, and "S" represents a special subframe containing the 3 special fields.

TABLE 1

| Config-uration | Switch-point Periodicity | Subframe Number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

For the TDD system, since HARQ-ACK of a physical downlink shared channel (PDSCH) and a downlink semi-persistent scheduling (SPS) release physical downlink control channel (PDCCH)/enhanced physical downlink control channel (EPDCCH) are transmitted in an uplink subframe, as shown in FIG. 2, the number of downlink subframes whose HARQ-ACK is transmitted in an uplink subframe is referred to as a HARQ-ACK bundling window size.

For the TDD system, downlink downlink control information (DL DCI) contained in a DL SPS release PDCCH/EPDCCH and a PDCCH/EPDCCH for PDSCH scheduling includes a 2-bit downlink assignment index (DL DAI) field.

A DL DAI is a counter sent from a base station (eNB) to a user equipment (UE), and is used to indicate the total number of PDCCHs/EPDCCHs and DL SPS release PDCCHs/EPDCCHs of the eNB which have scheduled a PDSCH in a bundling window. A value of the DAI in a first DL DCI sent by the eNB in the bundling window is 1, a value of the DAI in a second DL DCI transmitted in the bundling window by the eNB is 2, and so on. Based on a value of the DL DCI field, the UE may determine whether it has missed a previous DL DCI(s) in a same bundling window, and may be able to determine an approach of transmitting HARQ-ACK feedback information of the same bundling window according to whether a DL DCI is lost or not. In addition, for TDD UL/DL configuration 1, 2, 3, 4, 5, or 6, UL DCI format 0/4 for physical uplink shared channel (PUSCH) scheduling includes a 2-bit UL DAI field to indicate a sum of the number of subframes used to transmit PDSCHs and the number of subframes used to transmit DL SPS release PDCCHs/EPDCCHs in a current bundling window, and is used to determine the number of HARQ-ACK bits when HARQ-ACK feedback information is transmitted in the PUSCH. For TDD UL/DL configuration 0, Uplink Downlink control Information (UL DCI) format 0/4 for PUSCH scheduling includes a 2-bit uplink index (UL index) field to indicate whether a PUSCH of 1 uplink subframe or PUSCHs of 2 uplink subframes is/are scheduled when a downlink subframe schedules PUSCHs of 2 uplink subframes, and indicate a PUSCH of which uplink subframe is scheduled when the downlink subframe schedules a PUSCH of 1 uplink subframe.

For the FDD system, since the number of downlink subframes whose HARQ-ACK is transmitted in an uplink subframe is 1, therefore, a DL DCI contained in a DL SPS release PDCCH/EPDCCH or PDCCH/EPDCCH for PDSCH scheduling does not contain a 2-bit DL DAI field, and UL DCI format 0/4 for PUSCH scheduling does not contain a 2-bit UL DAI field.

To improve transmission rates for users, a LTE advanced (LTE-A) system is proposed. In the LTE-A system, a relative large working bandwidth is obtained by aggregating multiple component carriers (CCs), i.e., carrier aggregation (CA), to construct uplinks and downlinks in a communication system so as to support higher transmission rates. For example, five 20 MHz CCs may be aggregated to support a 100 MHz bandwidth. Here, each CC is referred to as a cell. For a UE, a base station may configure the UE being working in multiple CCs of which one CC is a primary CC (a PCC or a Pcell), and the other CCs are referred to as secondary CCs (SCCs or Scells).

To further fully use spectral resources including unlicensed spectral resources, a UE may use a CA system aggregating more than 5 CCs, e.g., a CA system aggregating up to 32 cells, so as to get a larger working bandwidth.

In the TDD system, to transmit HARQ-ACK feedback information corresponding to data of multiple downlink subframes of a same cell in an uplink subframe n, DL DAI information should be indicated when the data of the multiple downlink subframes is scheduled, and DL DAI information of different cells is indicated independently, as shown in FIG. 3.

An approach of feeding back HARQ-ACK feedback information by an UE is physical uplink control channel (PUCCH) format 3 which may support 5 cells at most. A base station may transmit an uplink grant (UL grant) in a PDCCH to schedule PUSCH resources for the UE. A value of an UL DAI in the UL grant is used to determine the number of bits of HARQ-ACK feedback information transmitted using the approach of PUCCH format 3.

When the UE is configured with PUCCH format 3 to transmit HARQ-ACK, for HARQ-ACK transmission in a PUCCH, or in a PUSCH, in which the HARQ-ACK transmission in the PUSCH is scheduled by a PDCCH/EPDCCH where there is no UL DAI field, or the HARQ-ACK transmission in the PUSCH is not scheduled by a detected PDCCH/EPDCCH, assume the UE is configured with 2 cells and a size of a bundling window of the two cells is M. In this case, for a cell with a single input and multiple output (SIMO) transmission mode, the number of bits needed for transmitting HARQ-ACK feedback information thereof is M; for a cell with a multiple input and multiple out (MIMO) transmission mode, if the number of bits of HARQ-ACK feedback information to be transmitted of all the cells of the UE calculated out according to the size of the bundling window of the cells is smaller than or equal to N (e.g., 20), then the number of bits needed for transmitting HARQ-ACK feedback information of the cell is M*2; or for a cell with the MIMO transmission mode, if the number of bits of HARQ-ACK feedback information to be transmitted of all the cells of the UE calculated out according to the size of the bundling window of the cells is larger than N (e.g., 20), then the number of bits needed for transmitting HARQ-ACK feedback information of the cell is M.

When the UE is configured with PUCCH format 3 to transmit HARQ-ACK, for HARQ-ACK transmission in a PUSCH, which is scheduled by a PDCCH/EPDCCH where there is an UL DAI field, assume the UE is configured with 2 cells and a value of the UL DAI is M. In this case, for a cell with the SIMO transmission mode, the number of bits needed for transmitting HARQ-ACK feedback information thereof is M; for a cell with the MIMO transmission mode, if the number of bits of HARQ-ACK feedback information to be transmitted of all the cells of the UE calculated out according to the value of the UL DAI is smaller than or equal to N (e.g., 20), then the number of bits needed for transmitting HARQ-ACK feedback information of the cell is M*2; or for a cell with the MIMO transmission mode, if the number of bits of HARQ-ACK feedback information to be transmitted of all the cells of the UE calculated out according to the value of the UL DAI is larger than N (e.g., 20), then the number of bits needed for transmitting HARQ-ACK feedback information of the cell is M.

When a UE is configured with too many cells, e.g., 32 cells at most, to indicate scheduling of data of multiple cells within a same subframe, a cell specific DL DAI may be introduced. This cell specific DL DAI is not used to indicate data transmission of multiple downlink subframes scheduled on a same cell, but to indicate data transmission of multiple cells scheduled on a subframe, as shown in FIG. 4. For example, for all cells which need to feed back HARQ-ACK information in a subframe n, a value of a DL DAI is equal to the number of DL grants have been transmitted. A UL DCI for PUSCH scheduling includes a UL DAI field, a value of the UL DAI is equal to the total number of PDSCHs and DL SPS release PDCCHs/EPDCCHs that have been transmitted. For the FDD system, the number of HARQ-ACK bits of all cells which need to feed back HARQ-ACK information in a subframe n is referred to as the total number of HARQ-ACK bits. Because in a same subframe, when transmission modes of different cells are different, the numbers of HARQ-ACK bits of the different cells are different too, and when transmission modes of different cells are same, the numbers of HARQ-ACK bits of the different cells are same as well. In addition, if HARQ-ACK of all different cells is spatially bundled, no matter transmission modes of the different cells are same or not, the numbers of HARQ-ACK bits of the different cells are same.

DISCLOSURE OF INVENTION

Technical Problem

The present disclosure provides a method and an apparatus for transmitting/receiving HARQ-ACK information in a wireless communication system supporting carrier aggregation.

Solution to Problem

According to an embodiment of the present disclosure, a method for transmitting automatic repeat request acknowledgement (HARQ-ACK) information by a user equipment (UE) in a wireless communication system supporting carrier aggregation (CA), includes:
receiving a downlink signal from a base station;
determining the number of bits of HARQ-ACK information for cells configured for the UE on the basis of at least one of an uplink downlink assignment index (UL DAI), the number of downlink subframes, the number of the cells configured for the UE, which are acquired from the downlink signal, and a transmission mode; and
transmitting an uplink subframe including the HARQ-ACK information for the cells.

Further, according to an embodiment of the present disclosure, a user equipment (UE) for transmitting automatic repeat request acknowledgement (HARQ-ACK) information in a wireless communication system supporting carrier aggregation (CA), includes:
a transceiver for transmitting/receiving a signal;
a controller for controlling the UE to receive a downlink signal from a base station, to determine the number of bits of HARQ-ACK information for cells configured for the UE on the basis of at least one of an uplink downlink assignment index (UL DAI), the number of downlink subframes, the number of the cells configured for the UE, which are acquired from the downlink signal, and a transmission mode and to transmit an uplink subframe including the HARQ-ACK information for the cells.

Further, according to an embodiment of the present disclosure, a method for transmitting hybrid automatic repeat request acknowledgement (HARQ-ACK) in an enhanced carrier aggregation system, includes:
a user equipment (UE) receiving a physical downlink control channel (PDCCH)/enhanced physical downlink control channel (EPDCCH) and a physical downlink shared channel (PDSCH) transmitted from a base station;
the UE determining the number of bits of HARQ-ACK feedback information of cells configured for the UE to be transmitted in a physical uplink shared channel (PUSCH) or a physical unlink control channel (PUCCH) of a current uplink subframe, according to an uplink downlink assignment index (UL DAI) obtained from an uplink grant (UL Grant) and the number of PDSCH subframes and PDCCH/EPDCCH subframes indicating downlink semi-persistent scheduling release received in a HARQ-ACK bundling window, or according to transmission modes or the number of the cells configured for the UE; and
the UE transmitting the HARQ-ACK feedback information of all the cells in the PUSCH or the PUCCH of the current uplink subframe.

When the current uplink subframe is in a secondary cell (Scell), determining the number of bits of the HARQ-ACK feedback information includes:

determining the number of HARQ-ACK bits to be fed back according to the UL DAI and the number of the PDSCH subframes and the PDCCH/EPDCCH subframes indicating downlink SPS release received in the HARQ-ACK bundling window, in which a UL/DL downlink control information (DCI) format scrambled by a cell radio network temporary identifier (C-RNTI) of the UE in a specific PDCCH/EPDCCH search space of the Scell of the UE includes a UL DAI and a DL DAI; or when the current uplink subframe is in a primary cell (Pcell), determining the number of bits of the HARQ-ACK feedback information includes:

determining the number of the HARQ-ACK bits to be fed back according to the number of the cells of the UE, in which UL/DL DCI formats scrambled by the C-RNTI of the UE in common and specific PDCCH/EPDCCH search spaces of the Pcell of the UE do not include a UL DAI and a DL DAI.

When the current uplink subframe is in a Scell, or the current uplink subframe is in a Pcell and the current uplink subframe is scheduled by UL DCI in a UE specific PDCCH/EPDCCH, determining the number of bits of the HARQ-ACK feedback information includes: determining the number of HARQ-ACK bits to be fed back according to the UL DAI, the PDSCH subframes and the PDCCH/EPDCCH subframes indicating downlink SPS release, in which a UL/DL DCI format scrambled by a C-RNTI of the UE in a specific PDCCH/EPDCCH search space of the Scell or the Pcell of the UE includes a UL DAI and a DL DAI; and when the current uplink subframe is in the Pcell and the current uplink subframe is scheduled by UL DCI in a common PDCCH, determining the number of bits of the HARQ-ACK feedback information comprises: determining the number of the HARQ-ACK bits to be fed back according to the number of cells of the UE; in which a UL/DL DCI format scrambled by the C-RNTI of the UE in a common PDCCH search space of the Pcell of the UE does not include a UL DAI and a DL DAI.

The UE transmitting the HARQ-ACK feedback information of all the cells in the PUSCH of the current uplink subframe includes:

when the DL DAI counts starting from the Scell, arranging a HARQ-ACK bit of the Pcell foremost, and then arranging HARQ-ACK bits of all Scells in an ascending order of values of the DL DAI; and when the DL DAI counts starting from the Pcell, if the UE detects a PDCCH for PDSCH scheduling and a PDCCH indicating DL SPS release in a common search space of the Pcell or in a UE specific search space of the Pcell, the PDCCH for PDSCH scheduling and the PDCCH indicating DL SPS release in the UE specific search space where the PDCCH for PDSCH scheduling and the PDCCH indicating DL SPS release are detected do not comprise a DL DAI field, and a transmission mode of the Pcell is a single input and multiple output (SIMO) transmission mode, or the transmission mode of the Pcell is a multiple input and multiple output (MIMO) transmission mode but HARQ-ACK of the Pcell is spatially bundled, then arranging a HARQ-ACK bit of the Pcell foremost, and then arranging HARQ-ACK bits of all the Scells in an ascending order of values of the DL DAI; and if the UE detects a PDCCH for PDSCH scheduling and a PDCCH indicating DL SPS release in the UE specific search space of the PCell, and the PDCCH for PDSCH scheduling and the PDCCH indicating DL SPS release in the UE specific search space where the PDCCH for PDSCH scheduling and the PDCCH indicating DL SPS release are detected comprise a DL DAI field, then arranging HARQ-ACK bits of all Pcells and Scells in an ascending order of values of the DL DAI;

if the UE has not detected a PDCCH/EPDCCH for PDSCH scheduling and a PDCCH/EPDCCH indicating DL SPS release in the common search space and in the UE specific search space of the Pcell, then arranging HARQ-ACK bits of the PCell and the Scells in an ascending order of values of the DL DAI; and if the UE has downlink SPS transmission in the Pcell, and a transmission mode of the Pcell is the MIMO transmission mode and has not been spatially bundled, then arranging HARQ-ACK bits of the UE as: {HARQ-ACK bits of a SPS PDSCH of the Pcell, NACK, HARQ-ACK bits of the Scells arranged in an ascending order of values of the DL DAI}, or {the HARQ-ACK bits of the Scells arranged in the ascending order of values of the DL DAI, NACK, the HARQ-ACK bits of the SPS PDSCH of the Pcell}, in which, for an undetected PDSCH or an undetected PDCCH/EPDCCH indicating DL SPS release, a corresponding HARQ-ACK bit is set to NACK.

If the UE is configured with PUCCH format 3 or format X to transmit HARQ-ACK, and the HARQ-ACK is transmitted in the PUCCH, or if the UE transmits the HARQ-ACK in the PUSCH, and HARQ-ACK transmission in the PUSCH is scheduled by a PDCCH/EPDCCH where a UL DAI field is not present, or the HARQ-ACK transmission in the PUSCH is not scheduled by a detected PDCCH/EPDCCH, then determining the number of bits of the HARQ-ACK feedback information includes: the UE determining the total number of bits of HARQ-ACK feedback information of all the cells to be transmitted in the current uplink subframe according to configured transmission modes of all the cells.

If the UE is configured with PUCCH format 3 or format X to transmit HARQ-ACK, the HARQ-ACK is transmitted in the PUSCH, and HARQ-ACK transmission in the PUSCH is scheduled by a PDCCH/EPDCCH where a UL DAI field is present, then determining the number of bits of the HARQ-ACK feedback information comprises: the UE determining the number of bits of the HARQ-ACK feedback information according to a value of the UL DAI field carried in the PDCCH/EPDCCH which schedules the current uplink subframe, and the number of the PDSCH subframes and the PDCCH/EPDCCH subframes indicating DL SPS release received in the HARQ-ACK bundling window.

The method further includes: determining the number of bits M needed for transmitting the HARQ-ACK feedback information of all the cells according to the transmission modes of all the cells configured for the UE, in which the number of bits needed for transmitting HARQ-ACK feedback information of a cell with the SIMO transmission mode is 1, and the number of bits needed for transmitting HARQ-ACK feedback information of a cell with the MIMO transmission mode is 2;

if M is smaller than or equal to a preset positive integer N, then when the HARQ-ACK feedback information of all the cells is transmitted, the HARQ-ACK information of all the cells is not spatially bundled; and the value of the UL DAI field carried in the PDCCH/EPDCCH which schedules the current uplink subframe counts according to transmission blocks; and if M is larger than the preset positive integer N, then when the HARQ-ACK feedback information of all the cells is transmitted, HARQ-ACK information of a cell whose transmission mode is the MIMO transmission mode is spatially bundled; and the value of the UL DAI field carried in the PDCCH/EPDCCH which schedules the current uplink subframe counts according to the number of cells.

The method further includes: determining whether HARQ-ACK transmission of a serving cell whose transmission mode is the MIMO transmission mode is spatially bundled based on a higher layer signaling or a physical layer signaling;

in response to determining that the HARQ-ACK transmission of the serving cell whose transmission mode is the MIMO transmission mode is not spatially bundled according to the higher layer signaling or the physical layer signaling, then the value of the UL DAI field carried in the PDCCH/EPDCCH which schedules the current uplink subframe counting according to transmission blocks; and in response to determining that the HARQ-ACK transmission of the serving cell whose transmission mode is the MIMO transmission mode is spatially bundled according to the higher layer signaling or the physical layer signaling, then the value of the UL DAI field carried in the PDCCH/EPDCCH which schedules the current uplink subframe counting according to transmission blocks according to the number of cells.

The physical layer signaling is 1 bit added in DL DCI used by the PDCCH/EPDCCH that schedules the PDSCH, or an existing bit in the DL DCI, and is configured to indicate whether the HARQ-ACK of the UE should be spatially bundled; or the physical layer signaling is 1 bit added in UL DCI used by the PDCCH/EPDCCH that schedules the PUSCH, or an existing bit in the UL DCI, and is configured to indicate whether the HARQ-ACK of the UE should be spatially bundled.

The UE determines the number of bits of the HARQ-ACK feedback information, $B^{DL}$, according to the value of the UL DAI field, and the number of the PDSCH subframes and the PDCCH/EPDCCH subframes, when the HARQ-ACK is not spatially bundled, then $B^{DL}=W_{DAI}^{UL}+(2^L)*\text{ceiling}((2a+b-W_{DAI}^{UL})/(2^L))$; and when the HARQ-ACK is spatially bundled, then $B^{DL}=W_{DAI}^{UL}+(2^L)*\text{ceiling}((a+b-W_{DAI}^{UL})/(2^L))$;

where $W_{DAI}^{UL}$ is the value of the UL DAI field obtained from the UL Grant in the PDCCH/EPDCCH, ceiling ( ) is a rounded up function, " " A represents the total number of PDSCHs and PDCCH/EPDCCHs indicating DL SPS release of serving cells with a MIMO transmission mode, "L" is the number of bits of the UL DAI in the UL Grant, or the number of bits of a sum DAI/reference DAI obtained from DL DCI, and "/" represents "or".

The method further includes: carrying DL DAIs in PDCCHs/EPDCCHs for PDSCH scheduling or in PDCCHs/EPDCCHs indicating DL SPS release of all of or a part of the cells of the UE; in which a value of a DL DAI is to indicate the number of PDCCHs/EPDCCHs that have been transmitted till a current cell within the bundling window or the number of transmission blocks having been scheduled by the PDCCHs/EPDCCHs that have been transmitted till a current cell within the bundling window; or for serving cells with a MIMO transmission mode, the value of the DL DAI represents the number of PDCCHs/EPDCCHs that have been transmitted till the current cell within the bundling window, or for serving cells with a SIMO transmission mode, the value of the DL DAI represents the number of transmission blocks that have been scheduled till the current cell within the bundling window, in which within the bundling window, the serving cells with the MIMO transmission mode are arranged before the serving cells with the SIMO transmission mode, and DL DCI in a PDCCH/EPDCCH of a serving cell with the MIMO transmission mode carries an indicator indicating whether the HARQ-ACK of the serving cell with the MIMO transmission mode is spatially bundled.

If the UE is configured with PUCCH format 3 or format X to transmit HARQ-ACK, and the HARQ-ACK is transmitted in the PUSCH, then the UE determines the number of bits of HARQ-ACK feedback information of all the cells to be transmitted in the current uplink subframe according to the transmission modes configured for all the cells of; and the method further includes: determining a time and frequency resource weighting coefficient to transmit the HARQ-ACK according to a UL DAI included in a PDCCH/EPDCCH which schedules the current uplink subframe; and when the HARQ-ACK feedback information of all the cells is transmitted, determining the number of time and frequency resources occupied for feeding back the HARQ-ACK feedback information according to the time and frequency resource weighting coefficient.

Determining the number of bits of the HARQ-ACK feedback information of all the cells to be transmitted in the current uplink subframe includes:

the UE calculating the number of bits needed for transmitting the HARQ-ACK feedback information of all the cells according to the transmission modes of all the cells; in which the number of bits of HARQ-ACK feedback information of a cell with a SIMO transmission mode is 1, and the number of bits of HARQ-ACK feedback information of a cell with a MIMO transmission mode is 2;

if M is smaller than or equal to a preset positive integer N, then determining the number of bits needed for transmitting the HARQ-ACK feedback information of all the cells in the current uplink subframe is M; and when the HARQ-ACK feedback information of all of the cells is transmitted, not spatially bundling the HARQ-ACK feedback information of all the cells; and if M is larger than the preset positive integer N, then determining the number of bits needed for transmitting the HARQ-ACK feedback information of all the cells in the current UL subframe is M'; and when the HARQ-ACK feedback information is transmitted, spatially bundling the HARQ-ACK information of the cell with the MIMO transmission mode; in which when M' is calculated, the numbers of bits of HARQ-ACK feedback information of the cell with the SIMO transmission mode and the cell with the MIMO transmission mode are both 1.

Determining the number of bits of the HARQ-ACK feedback information of all the cells transmitted in the current uplink subframe includes:

determining whether HARQ-ACK of a serving cell with a MIMO transmission mode should be spatially bundled according to a higher layer signaling or a physical layer signaling;

determining the number of bits of HARQ-ACK feedback information of a respective cell according to a configured transmission mode of the respective cell; in which in response to determining that the HARQ-ACK transmission of the serving cell with the MIMO transmission mode should be spatially bundled, the number of bits of HARQ-ACK feedback information of the serving cell with the MIMO transmission mode and the number of bits of HARQ-ACK feedback information of a serving cell with a SIMO transmission mode are both 1; and in response to determining that the HARQ-ACK of the serving cell with the MIMO transmission mode should not be spatially bundled, the number of bits of the HARQ-ACK feedback information of the serving cell with the MIMO transmission mode is 2, and the number of bits of the HARQ-ACK feedback information of the serving cell with the SIMO transmission mode is 1; and summing the numbers of bits of HARQ-ACK feedback information of all serving cells to get a sum result as the total number of bits of the HARQ-ACK feedback information of all the cells to be transmitted in the current uplink subframe.

An apparatus for transmitting HARQ-ACK in an enhanced carrier aggregation system, includes: a receiving unit, a bit number determination unit, and a transmitting unit, wherein the receiving unit is to receive a physical downlink control channel (PDCCH)/enhanced physical downlink control channel (EPDCCH) and a physical downlink shared channel (PDSCH) transmitted from a base station;

the bit number determination unit is to determine the number of bits of HARQ-ACK feedback information of cells configured for the UE to be transmitted in a physical uplink shared channel (PUSCH) or a physical unlink control channel (PUCCH) of a current uplink subframe, according to a value of an uplink downlink assignment index (UL DAI) obtained from an uplink grant (UL Grant) and the number of PDSCH subframes and PDCCH/EPDCCH subframes indicating downlink semi-persistent scheduling release received in a HARQ-ACK bundling window, or according to transmission modes or the number of the cells configured for the UE; and the transmitting unit is to transmit the HARQ-ACK feedback information of all the cells in the PUSCH or the PUCCH of the current uplink subframe.

Advantageous Effects of Invention

As is seen from the technical solutions, in the present disclosure, a UE receives a PDCCH/EPDCCH and a PDSCH transmitted from a base station; the UE determines the number of bits of HARQ-ACK feedback information of cells configured for the UE to be transmitted in a PUSCH or a PUCCH of a current uplink subframe, according to a value of a UL DAI obtained from a UL Grant and the number of PDSCH subframes and PDCCH/EPDCCH subframes indicating downlink semi-persistent scheduling release received in a HARQ-ACK bundling window, or according to transmission modes or the number of the cells configured for the UE; and the UE transmits the HARQ-ACK feedback information of all the cells in the PUSCH or the PUCCH of the current uplink subframe. After the foregoing process, the number of bits of HARQ-ACK feedback information of all cells to be transmitted in an uplink subframe can be determined properly, to feedback HARQ-ACK information properly.

BRIEF DESCRIPTION OF DRAWINGS

FIG. 1 is a diagram illustrating a structure of a LTE FDD frame;

FIG. 2 is a diagram illustrating a structure of a LTE TDD frame;

FIG. 3 is a schematic diagram of DL DAI information in a TDD system;

FIG. 4 is a schematic diagram of cell specific DL DAI information;

FIG. 5 is a diagram for explaining a method for HARQ-ACK in a wireless communication system supporting carrier aggregation according to an embodiment of the present disclosure;

FIG. 6 is a first schematic diagram of a bundling window in a TDD system according to an embodiment of the present disclosure; and FIG. 7 is a second schematic diagram of the bundling window in the TDD system according to an embodiment of the present disclosure; and FIG. 8 is a diagram for explaining a method for DL DAI counting according to an embodiment of the present disclosure.

MODE FOR THE INVENTION

To make the objects, technical schemes and advantages of the present disclosure clearer, the present disclosure will be described in detail hereinafter with reference to the accompanying drawings and embodiments.

FIG. 5 is a diagram for explaining a method for HARQ-ACK in a wireless communication system supporting carrier aggregation according to an embodiment of the present disclosure.

Referring to FIG. 5,

Step 501: a UE receives information on a PDCCH/EPDCCH and a PDSCH sent from a base station.

Step 502: the UE determines the number of bits of HARQ-ACK feedback information to be transmitted by respective cells configured for the UE in a PUSCH or PUCCH of a current uplink subframe, based on an uplink downlink assignment index (UL DAI) obtained from a UL Grant and the number of PDSCH subframes and PDCCH/EPDCCH subframes indicating downlink SPS release received in a HARQ-ACK bundling window, or based on the number of all the configured cells or transmission modes of the configured cells.

Specifically, the UE may determine the number of bits of the HARQ-ACK feedback information to be transmitted in the PUSCH based on the UL DAI and the number of the PDSCH subframes and the PDCCH/EPDCCH subframes indicating downlink SPS release received in the HARQ-ACK bundling window. And the UE may determine the number of HARQ-ACK feedback information to be transmitted in the PUCCH based on the number of all the configured cells or the transmission modes of all the configured cells.

Step 503: the UE transmits the HARQ-ACK feedback information of the respective cells in the PUSCH or PUCCH of the current uplink subframe.

The technical solution of the present disclosure will be further elaborated hereinafter by way of several embodiments.

Embodiment 1

A UE is configured with a plurality of FDD cells. Designs of a DL DAI and a UL DAI will be described first. Herein, when a PUCCH is scheduled, the UL DAI is not present, and when a PUSCH is scheduled, the UL DAI may be present or may not.

To indicate scheduling of data of multiple cells in a same downlink subframe, a cell specific DL DAI is introduced into DL DCIs of PDCCHs/EPDCCHs for PDSCH scheduling and PDCCHs/EPDCCHs indicating downlink SPS release of a part of or all of the cells, to indicate the number of PDCCHs/EPDCCHs having been transmitted or the number of transmission blocks (TBs) having been scheduled till a current cell. The number of HARQ-ACK bits to be transmitted in a PUSCH is calculated by introducing a UL DAI into UL DCIs for PUSCH scheduling of a part of or all of the cells, or based on the current number of cells of the UE.

Since in a traditional FDD system (3GPP Rel-12), all downlink DCI formats do not contain a DL DAI bit field, and all uplink DCI formats do not contain a UL DAI bit field, therefore, the uplink and downlink DCI formats in the traditional FDD system need to be optimized.

According to an implementation of the present disclosure, the uplink and downlink DCI formats in the traditional FDD system may be optimized in the following ways. In a Pcell configured for the UE, uplink and downlink DCI formats scrambled by a cell radio network temporary identity (C-RNTI) of the UE are kept unchanged in common and specific PDCCH/EPDCCH search spaces, and in a Scell configured for the UE, a UL DAI field and a DL DAI field are respectively introduced into the uplink and downlink DCI formats scrambled by the C-RNTI of the UE in a UE specific PDCCH/EPDCCH search space, in which the UL/DL DAI field includes N bits, e.g., N=2 or 3. In this case, if an uplink subframe to feed back HARQ-ACK is in the PCell, then the number of HARQ-ACK bits to be fed back is determined based on the number of cells of the UE, and if the uplink subframe to feed back HARQ-ACK is located in the Scell, then the number of HARQ-ACK bits to be fed back is determined based on the UL DAI. When the number of HARQ-ACK bits to be fed back is determined based on the UL DAI, the number of PDSCH subframes and PDCCH/EPDCCH subframes indicating downlink SPS release received in a HARQ-ACK bundling window should be further considered. Same applies to the following, and will not be elaborated.

According to another implementation of the present disclosure, in the Pcell configured for the UE, the uplink and downlink DCI formats scrambled by the C-RNTI of the UE in the common PDCCH search space are kept unchanged; and the UL DAI field and the DL DAI field are respectively introduced into the uplink and downlink DCI formats scrambled by the C-RNTI of the UE in the UE specific PDCCH/EPDCCH search space in the Pcell configured for the UE and into the uplink and downlink DCI formats scrambled by the C-RNTI of the UE in the UE specific PDCCH/EPDCCH search space in the Scell configured for the UE, in which the UL/DL DAI field includes N bits, e.g., N=2 or 3. In this case, if the uplink subframe to feed back the HARQ-ACK is in the Pcell and the uplink subframe is scheduled by a UL DCI in the UE specific PDCCH/EPDCCH, or if the uplink subframe to feed back the HARQ-ACK is in the Scell, the number of HARQ-ACK bits to be fed back is determined according to the UL DAI, or otherwise, the number of HARQ-ACK bits to be fed back is determined according to the number of the cells of the UE.

In the following several HARQ-ACK transmission methods of the Pcell and the Scells will be described.

Method 1

A method for arranging HARQ-ACK bits is as follows. DL DAIs count from the Scell configured for the UE, and if a transmission mode of the Pcell is a SIMO transmission mode, or if the transmission mode of the Pcell is a MIMO transmission mode but HARQ-ACK of the Pcell is spatially bundled, then a HARQ-ACK bit of the Pcell is arranged in a first place, and if the transmission mode of the Pcell is the MIMO transmission mode but the HARQ-ACK of the Pcell has not been spatially bundled, then HARQ-ACK bits of the Pcell are arranged in first and second places, then HARQ-ACK bits of the Scells are arranged according to an ascending order of the DL DAIs. HARQ-ACK information of an undetected PDSCH and an undetected PDCCH/EPDCCH indicating downlink SPS release is set to NACK.

For example, when the UE has not detected a PDCCH/EPDCCH for PDSCH scheduling and has not detected a PDCCH/EPDCCH indicating downlink SPS release in the Pcell, there is no DL SPS transmission of the Pcell in the subframe, and the transmission mode of the Pcell is the SIMO transmission mode, or the transmission mode of the Pcell is the MIMO transmission mode and has been spatially bundled, then the HARQ-ACK of the UE may be arranged as: {NACK, HARQ-ACK bits of the Scells sorted based on the DL DAIs}. When the UE has not detected a PDCCH/EPDCCH for PDSCH scheduling and has not detected a PDCCH/EPDCCH indicating downlink SPS release in the Pcell, there is no downlink SPS transmission of the Pcell in the subframe, and the transmission mode of the Pcell is the MIMO transmission mode and has not been spatially bundled, then the HARQ-ACK of the UE may be arranged as: {NACK, NACK, HARQ-ACK bits of the Scells sorted based on the DL DAIs}. When the UE detects a PDCCH/EPDCCH for PDSCH scheduling in the Pcell, the transmission mode of the Pcell is the MIMO transmission mode and has not been spatially bundled, then the HARQ-ACK of the UE may be arranged as: {a HARQ-ACK bit of PDSCH codeword 0 of the Pcell, a HARQ-ACK bit of PDSCH codeword 1 of the Pcell, HARQ-ACK bits of the Scells sorted based on the DL DAIs}. When the UE has downlink SPS PDSCH transmission in the Pcell, and the transmission mode of the Pcell is the MIMO transmission mode and has not been spatially bundled, then the HARQ-ACK of the UE may be arranged as: {HARQ-ACK bits of the SPS PDSCH of the Pcell, NACK, HARQ-ACK bits of the Scells sorted based on the DL DAIs}, or {HARQ-ACK bits of the Scells sorted based on the DL DAIs, NACK, HARQ-ACK bits of the SPS PDSCH of the Pcell}.

Method 2

A method for arranging HARQ-ACK bits is as follows.

Assuming that DL DAIs count from the Pcell configured for the UE, then if the UE detects a PDCCH for PDSCH scheduling and a PDCCH indicating downlink SPS release in the common search space of the Pcell or in the UE specific search space of the Pcell (in the UE specific search space of the Pcell, a PDCCH/EPDCCH for PDSCH scheduling and a PDCCH/EPDCCH indicating DL SPS release do not contain a DL DAI field), and the transmission mode of the Pcell is the SIMO transmission mode, or the transmission mode of the Pcell is the MIMO transmission mode but HARQ-ACK is spatially bundled, then a HARQ-ACK bit of the Pcell is arranged in a first place, then HARQ-ACK bits of the Scells are arranged in an ascending order of the DL DAIs. And if the UE detects a PDCCH/EPDCCH for PDSCH scheduling and a PDCCH/EPDCCH indicating downlink SPS release in the UE specific search space of the Pcell (in the UE specific search space of the Pcell, a PDCCH/EPDCCH for PDSCH scheduling and a PDCCH/EPDCCH indicating DL SPS release contain a DL DAI field), then the HARQ-ACK bits of the Pcell and the Scells are arranged in an ascending order of the DL DAIs.

Assuming that the UE has not detected a PDCCH/EPDCCH for PDSCH scheduling and a PDCCH/EPDCCH indicating downlink SPS release in the common search space and the UE specific search space of the Pcell, then the HARQ-ACK bits of the Pcell and the Scells are arranged in an ascending order of the DL DAIs; and HARQ-ACK information of an undetected PDSCH and an undetected PDCCH/EPDCCH indicating downlink SPS release is set to NACK.

If the UE has downlink SPS transmission in the Pcell, and the transmission mode of the Pcell is the MIMO transmission mode and has not been spatially bundled, then HARQ-ACK of the UE may be arranged as: {HARQ-ACK bits of the SPS PDSCH of the Pcell, NACK, HARQ-ACK bits of the Scells arranged based on the DL DAIs}, or {HARQ-ACK bits of the Scells arranged based on the DL DAIs, NACK, HARQ-ACK bits of the SPS PDSCH of the Pcell}.

Embodiment 2

A processing mode in the present embodiment relates to a situation where HARQ-ACK is transmitted in a PUCCH or in a PUSCH. For the situation where HARQ-ACK is transmitted in a PUCCH, a UL DAI is not included; and for the situation where HARQ-ACK is transmitted in a PUSCH, a UL DAI may be included, or may not be included.

Assuming that a UE is configured with multiple FDD cells, if a transmission mode configured for a cell by the UE is the SIMO transmission mode, a downlink subframe corresponds to one transmission block, and HARQ-ACK transmitted thereof is 1 bit; and if a transmission mode configured for a cell by the UE is the MIMO transmission mode, a downlink subframe corresponds to two transmission blocks, and HARQ-ACK transmitted thereof is 2 bits. Here a bundling window is counted cell specific, and a size of the bundling window is to indicate the number of downlink subframes of all cells whose HARQ-ACK feedback information is transmitted in a same PUCCH. That is, if the number of downlink subframes whose HARQ-ACK is transmitted in an uplink subframe is 4, then the size of the bundling window is 4, as shown in FIG. 6. Or the size of the bundling window is to indicate the number of transmission blocks in downlink subframes of all cells whose HARQ-ACK feedback information is transmitted in a same PUCCH. That is, if the number of downlink subframes whose HARQ-ACK is transmitted in an uplink subframe is 4, in which 2 cells are the SIMO transmission mode, and 2 cells are the MIMO transmission mode, then the number of HARQ-ACK bits to be transmitted in an uplink subframe is 1+1+2+2=6, and the size of the bundling window is 6, as shown in FIG. 7.

Transmission modes configured for different cells whose HARQ-ACK feedback information is transmitted in a same uplink subframe may be different. Therefore, in a situation where some cells may be configured with the SIMO transmission mode, and HARQ-ACK feedback information of a downlink subframe of a respective cell is 1 bit, and some cells may be configured with the MIMO transmission mode, and HARQ-ACK feedback information of a downlink subframe of a respective cell is 2 bits, how DL DAIs in PDCCHs/EPDCCHs for PDSCH scheduling and PDCCHs/EPDCCHs indicating downlink SPS release within a bundling window count should be considered.

A method for DL DAI counting is to indicate the number of PDCCHs/EPDCCHs that have been transmitted till a current cell within a bundling window, in which each PDCCH/EPDCCH schedules a PDSCH or indicates downlink SPS release, and in addition, the UL DAI indicates the number of PDSCHs and PDCCHs/EPDCCHs indicating downlink SPS release scheduled by an eNB in a current subframe. The method for DL DAI counting is applicable to a situation where all cells are configured with the SIMO transmission mode, or configured with the MIMO transmission mode and HARQ-ACK is spatially bundled. A value of a DAI in a first DL DCI sent by the eNB in the bundling window is 1, and a value of a DAI in a second DL DCI sent by the eNB in the bundling window is 2, and so on. According to a value of the DL DAI field, the UE may determine whether it has missed a previous DL DCI(s) in a same bundling window, and may determine a method of transmitting HARQ-ACK feedback information in a same bundling window according to whether a DL DCI is lost or not.

Another method for DL DAI counting is to indicate the number of transmission blocks that have been scheduled by PDCCHs/EPDCCHs that have been transmitted till a current cell within a bundling window, in which each PDCCH/EPDCCH of a cell with the SIMO transmission mode schedules one transmission block, and each PDCCH/EPDCCH of a cell with the MIMO transmission mode schedules two transmission blocks. This method for DL DAI counting is applicable to a situation where a UE is configured with both cells with the SIMO transmission mode and cells with the MIMO transmission mode, and HARQ-ACK of the cells with the MIMO transmission mode has not been spatially bundled. In addition, the UL DAI indicates the number of transmission blocks scheduled by an eNB in a current subframe. If a cell of a first DL DCI is configured with the SIMO transmission mode, then a value of a DAI in the first DL DCI transmitted by the eNB in the bundling window is 1, and if the cell of the first DL DCI is configured with the MIMO transmission mode, then the value of the DAI in the first DL DCI transmitted by the eNB in the bundling window is 2. If the cell of the first DL DCI is configured with the SIMO transmission mode, and a cell of a second DL DCI is configured with the SIMO transmission mode, then a value of a DAI in a second DL DCI transmitted by the eNB in the bundling window is 2; if the cell of the first DL DCI is configured with the SIMO transmission mode, and the cell of the second DL DCI is configured with the MIMO transmission mode, then the value of the DAI in the second DL DCI transmitted by the eNB in the bundling window is 3; and if the cell of the first DL DCI is configured with the MIMO transmission mode, and the cell of the second DL DCI is configured with the SIMO transmission mode, then the value of the DAI in the second DL DCI transmitted by the eNB in the bundling window is 3; if the cell of the first DL DCI is configured with the MIMO transmission mode, and the cell of the second DL DCI is configured with the MIMO transmission mode, then the value of the DAI in the second DL DCI transmitted by the eNB in the bundling window is 4, and so on. According to a value of the DL DAI field, the UE may determine whether it has missed a previous DL DCI(s) in a same bundling window, and may be able to determine a method of transmitting HARQ-ACK feedback information in a same bundling window according to whether a DL DCI is lost or not.

Still another method for DL DAI counting is that, within a bundling window, first serving cells with the MIMO transmission mode configured by the UE are arranged in the front, and then serving cells with the SIMO transmission mode configured by the UE are arranged. This arrangement may be carried out when the base station configures indexes of serving cells. That is, according to an ascending order of the indexes of the serving cells, first the serving cells with the MIMO transmission mode are arranged, and then the serving cells with the SIMO transmission mode are arranged. In this case, the indexes of the serving cells are also referred to as DL DAI sort indexes of the serving cells.

Or the indexes of the serving cells are not arranged in this order. In this case, when the base station determines a DL DAI when scheduling a serving cell, it sorts the serving cells. That is, the base station arranges the serving cells with the MIMO transmission mode in the front, and then arranges the serving cells with the SIMO transmission mode, which is referred to as DL DAI sort indexes of the serving cells. The DL DAI sort indexes of the serving cells do not involve a Pcell. For a serving cell with the MIMO transmission mode and a serving cell with the SIMO transmission mode, the numbers of bits and meanings of values of DL DAIs thereof are different, which will be elaborated hereinafter.

For a DL DAI contained in a DL DCI of a PDSCH for scheduling a serving cell with the MIMO transmission mode, the number of bits that it occupies is P-1 (P is a positive integer, e.g., P=3), a value of the DL DAI is used to represent how many PDCCHs/EPDCCHs have been transmitted till a current cell within a bundling window, and a 1-bit physical layer signaling in the DL DCI is used to indicate whether the HARQ-ACK of the UE needs to be spatially bundled or not. A specific indication method using the physical layer signaling may be that, for example, an indication value of the physical layer signaling being "0" represents that the HARQ-ACK of the UE is not spatially bundled; and the indication value of the physical layer signaling being "1" represents that the HARQ-ACK of the UE is spatially bundled. Indication values of physical layer signalings in PDCCHs/EPDCCHs for scheduling PDSCHs of all the serving cells with the MIMO transmission mode of the UE are same.

For a DL DAI contained in a DL DCI of a PDSCH for scheduling a serving cell with the SIMO transmission mode, the number of bits that it occupies is P, and a value of the DL DAI represents how many transmission blocks have been scheduled by PDCCHs/EPDCCHs that have been transmitted till a current cell with a bundling window, in which each PDCCH/EPDCCH of a cell with the SIMO transmission mode schedules one transmission block, and it is considered that each PDCCH/EPDCCH of a cell with the MIMO transmission mode schedules two transmission blocks. This method for DL DAI counting is applicable to a situation where a UE is configured with both cells with the SIMO transmission mode and cells with the MIMO transmission mode, in which HARQ-ACK of a serving cell with the MIMO transmission mode may be spatially bundled, or not. The UL DAI is to indicate the total number of transmission blocks scheduled by eNB in a current subframe.

FIG. 8 is a diagram for explaining a method for DL DAI counting according to an embodiment of the present disclosure.

Referring to FIG. 8, for example, P=3, the UE schedules 2 serving cells with the MIMO transmission mode, and then schedules 3 serving cells with the SIMO transmission mode. A DL DAI in a DL DCI for scheduling a first serving cell with the MIMO transmission mode is 2 bits, a value thereof is 1, and a 1-bit physical layer signaling in the DL DCI is "0", indicating the HARQ-ACK of the UE is not spatially bundled; and a DL DAI in a DL DCI for scheduling a second serving cell with the MIMO transmission mode is 2 bits, a value thereof is 2, and a 1-bit physical layer signaling in the DL DCI is "0", indicating the HARQ-ACK of the UE is not spatially bundled; then a DL DAI in a DL DCI for scheduling a first serving cell with the SIMO transmission mode is 3 bits, and a value thereof is 5; a DL DAI in a DL DCI for scheduling a second serving cell with the SIMO transmission mode is 3 bits, and a value thereof is 6; and a DL DAI in a DL DCI for scheduling a third serving cell with the SIMO transmission mode is 3 bits, and a value thereof is 7.

With the method, by using a value of the DL DAI field, the UE may determine whether it has missed a previous DL DCI(s) in a same bundling window, and may determine a method for transmitting HARQ-ACK feedback information according to whether there is DL DCL loss in the same bundling window.

A value of the UL DAI in the UL grant is used to determine the number of bits to transmit HARQ-ACK feedback information in a PUSCH using PUCCH format 3, or the value of the UL DAI in the UL grant is used to determine the number of bits to transmit HARQ-ACK feedback information in a PUSCH using PUCCH format X.

When the UE is configured with PUCCH format 3 to transmit the HARQ-ACK, or the UE is configured with PUCCH format X to transmit the HARQ-ACK, the HARQ-ACK is transmitted in the PUCCH, or in the PUSCH, in which HARQ-ACK transmission in the PUSCH is scheduled by a PDCCH/EPDCCH where there is no UL DAI field, or the HARQ-ACK transmission in the PUSCH is not scheduled by a detected PDCCH/EPDCCH, for a cell with the SIMO transmission mode, the number of bits needed for transmitting HARQ-ACK feedback information thereof is 1; and for a cell with the MIMO transmission mode, the number of bits needed for transmitting HARQ-ACK feedback information thereof is 2. The number of bits M needed for transmitting HARQ-ACK feedback information of all cells configured for the UE in an uplink subframe may be calculated out based on transmission modes of all the cells configured for the UE.

If the number of bits M needed for transmitting HARQ-ACK feedback information of all the cells of the UE calculated out is smaller than or equal to N according to the transmission modes of the configured cells (e.g., for PUCCH format 3, N=20), thus HARQ-ACK information of all the cells needs not to be spatially bundled. Based on this, for a cell with the SIMO transmission mode, when HARQ-ACK transmission is actually carried out, the number of bits of HARQ-ACK feedback information thereof is 1; and for a cell with the MIMO transmission mode, when HARQ-ACK transmission is actually carried out, the number of bits of HARQ-ACK feedback information thereof is 2. In this case, a DL DAI in a PDCCH/EPDCCH for PDSCH scheduling counts according to the transmission blocks. That is, the number of bits of HARQ-ACK feedback information of all the cells finally determined to be transmitted in the PUSCH of the current uplink subframe is M.

If the number of bits M needed for transmitting the HARQ-ACK feedback information of all the cells of the UE calculated out is larger than N according to the transmission modes of the configured cells (e.g., for PUCCH format 3, N=20), thus HARQ-ACK information of a configured cell with the MIMO transmission mode needs to be spatially bundled. Therefore, for a cell with the SIMO transmission mode, when HARQ-ACK is actually carried out, the number of bits of HARQ-ACK feedback information thereof is 1; while for a cell with the MIMO transmission mode, when HARQ-ACK is actually carried out, the number of bits of HARQ-ACK feedback information thereof is 1. And in this case, a DL DAI in a PDCCH/EPDCCH for PDSCH scheduling counts according to the number of cells. That is, the finally determined number of bits of the HARQ-ACK feedback information of all the cells transmitted in the PUSCH of the current uplink subframe is M', i.e., the total number of the cells.

Assuming that the UE is configured with 6 cells all of which are FDD cells in which 2 cells are configured with the SIMO transmission mode, and the other 4 cells are configured with the MIMO transmission mode, a HARQ-ACK transmission format configured for the UE is PUCCH format 3, and the number of bits of HARQ-ACK feedback information of the 6 cells is 2+4*2=10<20, therefore, HARQ-ACK of the cells configured with the MIMO transmission mode needs not to be spatially bundled, the number of bits of HARQ-ACK feedback information of a cell configured with the SIMO transmission mode is 1, and the number of bits of HARQ-ACK feedback information of a cell configured with the MIMO transmission mode is 2. In the following, assuming that the UE is configured with 16 cells, and all of the 16 cells are FDD cells in which 10 cells are configured with the SIMO transmission mode, and the other 6 cells are configured with the MIMO transmission mode, a HARQ-ACK transmission format configured for the UE is PUCCH format 3, and the number of bits of HARQ-ACK feedback information of the 16 cells is 10+6*2=22>20, therefore, HARQ-ACK of the cells configured with the MIMO transmission mode needs to be spatially bundled, the number of bits of HARQ-ACK feedback information of a cell configured with the SIMO transmission mode is 1, and the number of bits of HARQ-ACK feedback information of a cell configured with the MIMO transmission mode is 1.

If the UE is configured with PUCCH format 3 to transmit HARQ-ACK, or the UE is configured with PUCCH format X to transmit the HARQ-ACK, the HARQ-ACK is transmitted in a PUSCH, and HARQ-ACK transmission in the PUSCH is scheduled by a PDCCH/EPDCCH where there is a UL DAI field, for a cell with the SIMO transmission mode, the number of bits needed for transmitting HARQ-ACK feedback information thereof is 1; for a cell with the MIMO transmission mode, the number of bits to transmit HARQ-ACK feedback information thereof is 2. The number of bits M of HARQ-ACK feedback information of all the cells configured for the UE to be transmitted in an uplink subframe is calculated out based on transmission modes of all the cells configured for the UE. If the number of bits M of the HARQ-ACK feedback information of all the cells configured for the UE calculated according to the transmission modes of the cells is smaller than or equal to N (e.g., for PUCCH format 3, N=20), HARQ-ACK information of all the cells needs not to be spatially bundled. Therefore, for a cell with the SIMO transmission mode, when HARQ-ACK transmission is actually carried out, the number of bits of HARQ-ACK feedback information thereof is 1; and for a cell with the MIMO transmission mode, when HARQ-ACK transmission is actually carried out, the number of bits of HARQ-ACK feedback information thereof is 2. In this case, the UL DAI counts according to transmission blocks, and the number of bits of HARQ-ACK feedback information transmitted by the UE is a value of the UL DAI.

Assuming that the UE is configured with 6 cells, and all of the 6 cells are FDD cells in which 2 cells are configured with the SIMO transmission mode, and the other 4 cells are configured with the MIMO transmission mode, a HARQ-ACK transmission format configured for the UE is PUCCH format 3, and the number of bits of HARQ-ACK information of the 6 cells is 2+4*2=10<20, therefore, HARQ-ACK of the cells configured with the MIMO transmission mode needs not to be spatially bundled, the number of bits of HARQ-ACK feedback information of a cell with the SIMO transmission mode is 1, and the number of bits of HARQ-ACK feedback information of a cell with the MIMO transmission mode is 2. In this case, if the value of the UL DAI is equal to 6, then the number of HARQ-ACK bits to be transmitted in the PUSCH is 6.

The number of bits M needed for transmitting HARQ-ACK feedback information of all the cells configured for the UE in an uplink subframe is calculated according to transmission modes of all the cells configured for the UE. If the number of bits M needed for transmitting HARQ-ACK feedback information of all the cells configured for the UE according to the transmission modes of all the cells configured for the UE is larger than N (e.g., for PUCCH format 3, N=20), HARQ-ACK information of cells configured with the MIMO transmission mode should be spatially bundled. Therefore, for a cell with the SIMO transmission mode, when HARQ-ACK transmission is actually carried out, the number of bits of HARQ-ACK feedback information thereof is 1, and for a cell with the MIMO transmission mode, when HARQ-ACK transmission is actually carried out, the number of bits of HARQ-ACK feedback information thereof is 1. In the following, a method for determining the number of bits of HARQ-ACK feedback information transmitted by the UE will be described. In this case, the UL DAI counts based on the number of cells, and the number of bits of HARQ-ACK feedback information needs to be transmitted by the UE is the value of the UL DAI.

Assuming that the UE is configured with 16 cells, and all of the 16 cells are FDD cells in which 10 cells are configured with the SIMO transmission mode, and the other 6 cells are configured with the MIMO transmission mode, a HARQ-ACK transmission format configured for the UE is PUCCH format 3, and the number of bits of HARQ-ACK feedback information of the 16 cells is 10+6*2=22>20, therefore, HARQ-ACK of the cells configured with the MIMO transmission mode needs to be spatially bundled, the number of bits of HARQ-ACK feedback information of a cell with the SIMO transmission mode is 1, and the number of bits of HARQ-ACK feedback information of a cell with the MIMO transmission mode is 1. In this case, if the value of the UL DAI is equal to 13, then the number of HARQ-ACK bits to be transmitted in the PUSCH is 13.

As is seen from the foregoing, for the HARQ-ACK transmission in the PUSCH, whether HARQ-ACK of the UE needs to be spatially bundled or not is dependent on whether the total number of HARQ-ACK bits calculated out based on the cells configured for the UE and the transmission modes configured for the cells is larger than N or not, and is independent of the value of the UL DAI. Meanwhile, for HARQ-ACK transmission in the PUCCH, whether HARQ-ACK of the UE needs to be spatially bundled or not is dependent on whether the total number of HARQ-ACK bits calculated out based on the cells configured for the UE and the transmission modes configured for the UE is larger than N or not.

Another method for determining whether HARQ-ACK of the UE needs to be spatially bundled or not is based on whether a higher layer signaling configures or a physical layer signaling indicates HARQ-ACK of a serving cell with the MIMO transmission mode needing to be spatially bundled or not, including HARQ-ACK transmission of the UE in a PUCCH and HARQ-ACK transmission of the UE in a PUSCH. Indication by using the physical layer signaling may be adding 1 bit or reinterpreting a bit of a traditional field in a DL DCI used by a PDCCH/EPDCCH for PDSCH scheduling, to indicate whether HARQ-ACK of the UE needs to be spatially bundled or not, or indication by using the physical layer signaling may be adding 1 bit or re-interpreting a bit of a traditional field in a UL DCI used by a PDCCH/EPDCCH for PUSCH scheduling, to indicate whether HARQ-ACK of the UE needs to be spatially bundled or not. A specific indication method using the physical layer signaling may be that an indication value of the physical layer signaling being "0" represents that the HARQ-ACK of the UE is not spatially bundled; and the indication value of the physical layer signaling being "1" represents that the HARQ-ACK of the UE is spatially bundled. Indication values of physical layer signalings in PDCCHs/EPDCCHs for PDSCH scheduling of the UE are same. This method will be described in detail hereinafter.

If the higher layer signaling configures or the physical layer signaling indicates HARQ-ACK of a serving cell with the MIMO transmission mode needing to be spatially bundled, for a cell with the SIMO transmission mode, when HARQ-ACK transmission is carried out, the number of bits of HARQ-ACK feedback information thereof is 1; and for a cell with the MIMO transmission mode, when HARQ-ACK transmission is carried out, the number of bits of HARQ-ACK feedback information thereof is 1. In this case, a DL DAI in a PDCCH/EPDCCH for PDSCH scheduling counts according to the number of cells. In a situation where a UL DAI is not present (that is, the UE is configured with PUCCH format 3 or format X to transmit HARQ-ACK, and the HARQ-ACK is transmitted in a PUCCH, or if the UE transmits HARQ-ACK in a PUSCH, and the HARQ-ACK transmission in the PUSCH is scheduled by a PDCCH/EPDCCH where a UL DAI field is not present, or the HARQ-ACK transmission in the PUSCH is not scheduled by a detected PDCCH/EPDCCH), the number of HARQ-ACK bits to be transmitted is determined according to transmission modes of the respective cells; and in a situation where a UL DAL is present (that is, the UE is configured with PUCCH format 3 or format X to transmit HARQ-ACK, and a PUSCH for HARQ transmission is scheduled by a PDCCH/EPDCCH where a UL DAI field is present), a method for determining the number of HARQ-ACK bits to be transmitted by the UE according to the value of UL DAI is that the UL DAI counts according to the number of cells, and the number of HARQ-ACK bits to be transmitted by the UE is UL DAI, which is the same with the foregoing method of determining the number of HARQ-ACK bits according to the UL DAI.

Assuming that the UE is configured with 16 cells, all of the 16 cells are FDD cells in which 10 cells are configured with the SIMO transmission mode, and the other 6 cells are configured with the MIMO transmission mode, a HARQ-ACK transmission format configured for the UE is PUCCH format 3, the number of bits of HARQ-ACK feedback information of a cell with the SIMO transmission mode is 1, and HARQ-ACK of a cell configured with the MIMO transmission mode needs to be spatially bundled, and the number of bits of HARQ-ACK feedback information of a cell with the MIMO transmission mode is 1. In this case, if the UL DAI is equal to 13, then the number of HARQ-ACK bits to be transmitted in the PUSCH is 13.

Assume the higher layer signaling configures or the physical layer signaling indicates HARQ-ACK of a serving cell with the MIMO transmission mode needing not to be spatially bundled. For a cell with the SIMO transmission mode, when HARQ-ACK transmission is actually carried out, the number of bits of HARQ-ACK feedback information thereof is 1; and for a cell with the MIMO transmission mode, when HARQ-ACK transmission is actually carried out, the number of bits of HARQ-ACK feedback information thereof is 2. In this case, a DL DAI in a PDCCH/EPDCCH for PDSCH scheduling counts according to transmission blocks. In a situation where a UL DAI is not present (that is, the UE is configured with PUCCH format 3 or format X to transmit HARQ-ACK, and the HARQ-ACK transmission is in a PUCCH, or if the UE transmits HARQ-ACK in a PUSCH, and the HARQ-ACK transmission in the PUSCH is scheduled by a PDCCH/EPDCCH where a UL DAI field is not present, or the HARQ-ACK transmission in the PUSCH is not scheduled by a detected PDCCH/EPDCCH), the total number of HARQ-ACK bits to be transmitted is determined according to the transmission modes of the respective cells; and in a situation where a UL DAI is present (that is the UE is configured with PUCCH format 3 or format X to transmit HARQ-ACK, and the HARQ transmission in the PUSCH is scheduled by a PDCCH/EPDCCH where a UL DAI field is present), the UL DAI counts according to transmission blocks, and the number of bits of HARQ-ACK feedback information to be transmitted by the UE is UL DAI, which is same with the foregoing method of determining the number of HARQ-ACK bits according to the UL DAI.

Assuming that the UE is configured with 6 cells, all of the 6 cells are FDD cells in which 2 cells are configured with the SIMO transmission mode, and the other 4 cells are configured with the MIMO transmission mode, a HARQ-ACK transmission format configured for the UE is PUCCH format 3, the number of bits of HARQ-ACK feedback information of a cell with the SIMO transmission mode is 1, HARQ-ACK of a cell configured with the MIMO transmission mode needs not to be spatially bundled, the number of bits of HARQ-ACK feedback information of a cell with the MIMO transmission mode is 2. In this case, if the UL DAI is equal to 6, then the number of HARQ-ACK bits to be transmitted in the PUSCH is 6.

In the following, how the UE determines the number of HARQ-ACK bits, $B^{DL}$, based on a detected PDCCH/EPDCCH, the number of PDSCHs, and a value of a UL DAI will be described. If HARQ-ACK is not spatially bundled, then $$B^{DL} = W_{DAI}^{UL} + (2^L) * \text{ceiling}((2a+b-W_{DAI}^{UL})/(2^L))  \qquad \text{<equation 1>}$$

where $W_{DAI}^{UL}$ is the value of the UL DAI obtained by the UE from a UL Grant of the PDCCH/EPDCCH, or a value of a sum DAI or a reference DAI obtained by the UE from the PDCCH/EPDCCH, in which the value of the sum DAI or the reference DAI is a reference value used for calculating the number of HARQ-ACK bits;

ceiling( ) is a rounded up function;

where " " A represents the total number of PDSCHs and PDCCHs/EPDCCHs indicating DL SPS release in serving cells with the MIMO transmission mode detected by the UE, and "b" represents the total number of PDSCHs and PDCCHs/EPDCCHs indicating DL SPS release in serving cells with the SIMO transmission mode detected by the UE. And if the HARQ-ACK is spatially bundled, then $$B^{DL} = (W_{DAI}^{UL} + (2^L)) * \text{ceiling}((a+b-W_{DAI}^{UL})/(2^L))  \qquad \text{<equation 2>}$$

where $W_{DAI}^{UL}$ is the value of the UL DAI obtained by the UE from the UL Grant of the PDCCH/EPDCCH, or the value of the sum DAI or the reference DAI obtained by the UE from the PDCCH/EPDCCH, in which the value of the sum DAI value or the reference DAI is a reference value used for calculating the number of HARQ-ACK bits;

ceiling( ) is a rounded up function;

where " " A represents the total number of PDSCHs and PDCCHs/EPDCCHs indicating DL SPS release in serving cells with the MIMO transmission mode detected by the UE, and "b" represents the total number of PDSCHs and PDCCHs/EPDCCHs indicating DL SPS release in serving cells with the SIMO transmission mode detected by the UE. "L" in the expressions (1) and (2) is the number of bits of the UL DAI in the UL Grant, or the number of bits of a sum DAI obtained from the DL DCI, or the number of bits of reference DAI.

Embodiment 3

In the present embodiment, time and frequency resource weighting coefficients used for transmission of HARQ-ACK feedback information of respective cells are determined according to values of the UL DAI, and the number of time and frequency resources occupied by the HARQ-ACK feedback information is determined based on the time and frequency resource weighting coefficients.

First, the number of bits of HARQ-ACK feedback information is determined based on the number of cells configured for the UE and transmission modes configured for the cells, and is independent of the UL DAI. If the UE is configured with PUCCH format 3 to transmit HARQ-ACK, or the UE is configured with PUCCH format X to transmit HARQ-ACK, for HARQ-ACK transmission in a PUSCH, and for a cell with the SIMO transmission mode, the number of bits needed for transmitting HARQ-ACK feedback information thereof is 1; and for a cell with the MIMO transmission mode, the number of bits needed for transmitting HARQ-ACK feedback information thereof is 2. The number of bits M needed for transmitting HARQ-ACK feedback information of all the cells configured for the UE in an uplink subframe is calculated out based on transmission modes of all the cells configured for the UE. If the number of bits M needed for transmitting HARQ-ACK feedback information of all the cells of the UE calculated out based on the transmission modes of all the cells is smaller than or equal to N (e.g., for PUCCH format 3, N=20), HARQ-ACK feedback information of all the cells needs not to be spatially bundled, and therefore, for a cell with the SIMO transmission mode, the number of bits of HARQ-ACK feedback information thereof is 1; and for a cell with the MIMO transmission mode, the number of bits of HARQ-ACK feedback information thereof is 2. The number of bits M needed for transmitting HARQ-ACK feedback information of all the cells configured for the UE in an uplink subframe is calculated based on the transmission modes of all the cells configured for the UE. If the number of bits M needed for transmitting HARQ-ACK feedback information of all the cells configured for the UE calculated out according to the transmission modes of all the cells configured for the UE is larger than N (e.g., for PUCCH format 3, N=20), HARQ-ACK information of a cell with the MIMO transmission mode needs to be spatially bundled. Therefore, for a cell with the SIMO transmission mode, the number of bits of HARQ-ACK feedback information thereof is 1, and for a cell with the MIMO transmission mode, the number of bits of HARQ-ACK feedback information thereof is 1. Of course, for a cell with the MIMO transmission mode, similarly with that in Embodiment 2, whether HARQ-ACK information thereof needs to be spatially bundled or not for transmission may be configured by a higher layer signaling or may be indicated by a physical layer signaling. In the following, how to determine time and frequency resource weighting coefficients used for transmitting HARQ-ACK feedback information of the respective cells in a PUSCH according to the value of the UL DAI will be described.

If the UE is configured with PUCCH format 3 to transmit HARQ-ACK or the UE is configured with PUCCH format X to transmit HARQ-ACK, then for HARQ transmission in a PUSCH scheduled by a PDCCH/EPDCCH where a UL DAI field is not present, or the HARQ transmission in the PUSCH is not scheduled by a detected PDCCH/EPDCCH, a time and frequency resource weighting coefficient is 1. If the UE is configured with PUCCH format 3 to transmit HARQ-ACK or the UE is configured with PUCCH format X to transmit HARQ-ACK, for HARQ transmission in a PUSCH which is scheduled by a PDCCH/EPDCCH where a UL DAI field is present, the time and frequency resource weighting coefficient is determined according to a value of the UL DAI. A correspondence relation between UL DAIs and time and frequency resource weighting coefficients is shown in Table 2. Table 2 represents correspondence relation between UL DAIs and time and frequency resource weighting coefficients

TABLE 2

| UL DAI value ($W_{DAI}^{UL}$) | Time and Frequency Resource Weighting Coefficient |
| --- | --- |
| 1 | 1/4 |
| 2 | 2/4 |
| 3 | 3/4 |
| 4 | 4/4 |

As can be seen from the foregoing, determining a time and frequency resource weighting coefficient includes:

if the UE is configured with PUCCH format 3 or format X to transmit HARQ-ACK, the HARQ-ACK is transmitted in a PUSCH, and transmission in the PUSCH is scheduled by a PDCCH/EPDCCH where a UL DAI field is present, then a time and frequency resource weighting coefficient corresponding to a UL DAI carried in the PDCCH/EPDCCH which schedules the current uplink subframe is determined according to a preset correspondence relation between UL DAIs and time and frequency resource weighting coefficients, in which the preset correspondence relation may be as shown in Table 2, but the correspondence relation is not limited to these, and may be configured as needed; and if the UE is configured with PUCCH format 3 or format X to transmit the HARQ-ACK, the HARQ-ACK is transmitted in the PUSCH, and transmission in the PUSCH is scheduled by a PDCCH/EPDCCH where a UL DAI field is not present, or transmission of the UE in the PUSCH is not scheduled by a detected PDCCH/EPDCCH, then the time and frequency resource weighting coefficient is configured to be 1.

The number of time and frequency resources occupied by transmission of HARQ-ACK feedback information in the PUSCH of the present disclosure is obtained by multiplying the number of time and frequency resources determined according to traditional art by a time and frequency resource weighting coefficient.

As is seen from the foregoing embodiments, the method of transmitting HARQ-ACK feedback information provided according to the present disclosure determines the length of the HARQ-ACK feedback information and the number of time and frequency resources occupied by the HARQ-ACK feedback information according to a value of a UL DAI of a cell to which a PUSCH transmitting the HARQ-ACK feedback information belongs, so as to transmit HARQ-ACK feedback information properly in a CA system where uplink and downlink configurations of multiple cells are different, and further efficiently support a situation where uplink and downlink configurations of multiple CCs of CA are different.

The foregoing is implementation of HARQ-ACK transmission methods of the present disclosure. The present disclosure further provides a HARQ-ACK transmission apparatus of an enhanced carrier aggregation system to implement the forgoing transmission methods. A basic structure of the apparatus includes a receiving unit, a bit number determination unit, and a transmitting unit. Further, the operations of the receiving unit, the bit number determination unit, and the transmitting unit may be controlled through a controller of a UE.

The receiving unit is configured to receive a PDCCH/EPDCCH and a PDSCH transmitted from a base station. The bit number determination unit is configured to determine the number of bits of HARQ-ACK feedback information to be transmitted in a PUSCH or in a PUCCH by all the cells configured by the UE in a current uplink subframe, based on a UL DAI obtained from a UL Grant, and the number of PDSCH subframes and PDCCH/EPDCCH subframes indicating SPS release received in a HARQ-ACK bundling window, or based on transmission modes or the number of cells configured for the UE. The transmitting unit is configured to transmit HARQ-ACK feedback information of all the cells in the PUSCH or PUCCH of the current downlink subframe.

A base station corresponding to the UE may include a transceiver and a controller, and the controller of the base station may control the operations of providing the UE with control information for determining bits of HARQ-ACK feedback information and receiving the HARQ-ACK feedback information fed back from the UE.

What is described in the foregoing are only embodiments of the present disclosure, and should not be construed as limitations to the present disclosure. Any changes, equivalent replacements, modifications made without departing from the scope and spirit of the present disclosure are intended to be included within the protecting scope of the present disclosure.

The invention claimed is:

1. A method for transmitting hybrid automatic repeat request acknowledgement (HARQ-ACK) information by a user equipment (UE) in a wireless communication system, comprising:
receiving higher layer signaling;
determining whether to apply the HARQ-ACK spatial bundling based on the higher layer signaling;
determining at least one HARQ-ACK information bit corresponding to downlink data received in at least one cell, based on the higher layer signaling; and
transmitting HARQ-ACK information corresponding to the determined at least one HARQ-ACK information bit,
wherein a total number of the at least one HARQ-ACK information bit is determined based on a total number of the at least one cell, and
wherein the higher layer signaling includes at least one of a first single bit and a second single bit,
wherein the first single bit indicates whether to apply HARQ-ACK spatial bundling to HARQ-ACK information to be transmitted on a physical uplink control channel (PUCCH), and
wherein the second single bit, different from the first single bit, indicates whether to apply HARQ-ACK spatial bundling to HARQ-ACK information to be transmitted on a physical uplink shared channel (PUSCH).

2. The method of claim 1, wherein the determining the at least one HARQ-ACK information bit comprises:
when the HARQ-ACK spatial bundling is applied, determining a first number of HARQ-ACK information bits corresponding to downlink data received in at least one cell, and
when the HARQ-ACK spatial bundling is not applied, determining a second number of HARQ-ACK information bits corresponding to downlink data received in at least one cell.

3. A user equipment (UE) for transmitting hybrid automatic repeat request acknowledgement (HARQ-ACK) information in a wireless communication system, comprising:
a transceiver; and
a controller coupled with the transceiver and configured to:
receive a higher layer signaling;
determining whether to apply the HARQ-ACK spatial bundling based on the higher layer signaling;
determine at least one HARQ-ACK information bit corresponding to downlink data received in at least one cell, based on the higher layer signaling; and
transmit HARQ-ACK information corresponding to the determined at least one HARQ-ACK information bit,
wherein a total number of the at least one HARQ-ACK information bit is determined based on a total number of the at least one cell, and
wherein the higher layer signaling includes at least one of a first single bit and a second single bit,
wherein the first single bit indicates whether to apply the HARQ-ACK spatial bundling to HARQ-ACK information to be transmitted on a physical uplink control channel (PUCCH), and
wherein the second single bit, different from the first single bit, indicates whether to apply HARQ-ACK spatial bundling to HARQ-ACK information to be transmitted on a physical uplink shared channel (PUSCH).

4. The UE of claim 3, wherein the controller is further configured to:
when the HARQ-ACK spatial bundling is applied, determine a first number of HARQ-ACK information bits corresponding to downlink data received in at least one cell, and
when the HARQ-ACK spatial bundling is not applied, determine a second number of HARQ-ACK information bits corresponding to downlink data received in at least one cell.

5. A method for receiving hybrid automatic repeat request acknowledgement (HARQ-ACK) information by a base station in a wireless communication system, the method comprising:
transmitting, to a user equipment (UE), a higher layer signaling; and
receiving, from the UE, HARQ-ACK information in response to downlink data of at least one cell,
wherein a total number of bits of the received HARQ-ACK information is determined based on information indicating that the HARQ-ACK spatial bundling is applied included in the higher layer signaling and a total number of the at least one cell, and
wherein the higher layer signaling includes at least one of a first single bit and a second single bit,
wherein the first single bit indicates whether to apply HARQ-ACK spatial bundling to HARQ-ACK information to be transmitted on a physical uplink control channel (PUCCH), and wherein the second single bit, different from the first single bit, indicates whether to apply HARQ-ACK spatial bundling to HARQ-ACK information to be transmitted on a physical uplink shared channel (PUSCH).

6. A base station for receiving hybrid automatic repeat request acknowledgement (HARQ-ACK) information in a wireless communication system, the base station comprising:
a transceiver; and
a controller coupled with the transceiver and configured to:
  transmit, to a user equipment (UE), a higher layer signaling; and
  receive HARQ-ACK information in response to downlink data of at least one cell,
wherein a total number of bits of the received HARQ-ACK information is determined based on information indicating that HARQ-ACK spatial bundling is applied included in the higher layer signaling and a total number of the at least one cell, and
wherein the higher layer signaling includes at least one of a first single bit and a second single bit,
wherein the first single bit indicates whether to apply HARQ-ACK spatial bundling to HARQ-ACK information to be transmitted on a physical uplink control channel (PUCCH), and
wherein the second single bit, different from the first single bit, indicates whether to apply HARQ-ACK spatial bundling to HARQ-ACK information to be transmitted on a physical uplink shared channel (PUSCH).

* * * * *